July 5, 1938.  A. F. REILLY  2,122,724
SPECTACLE CASE
Filed Jan. 20, 1938
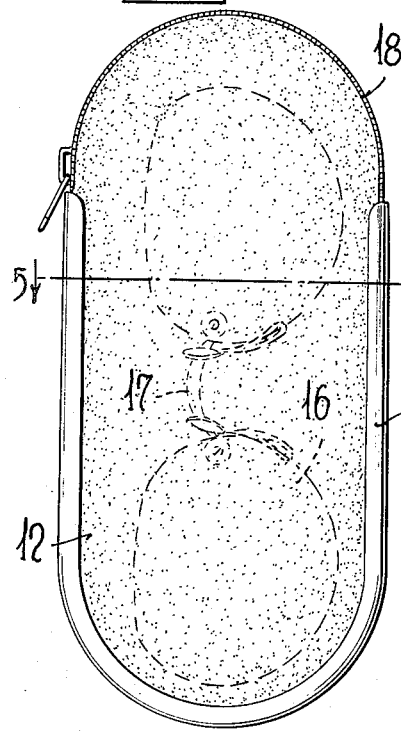
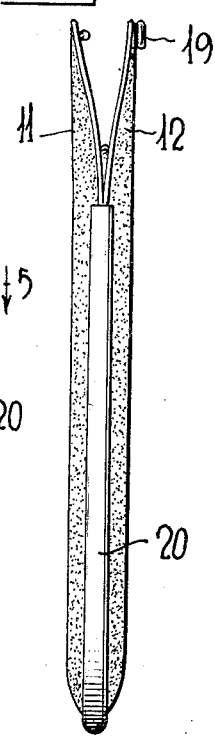
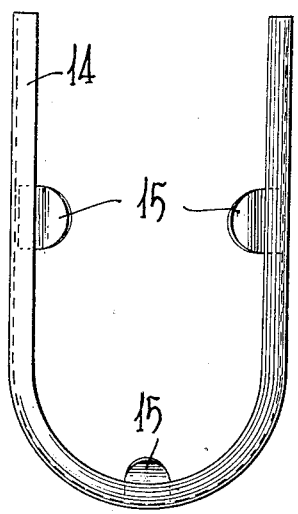
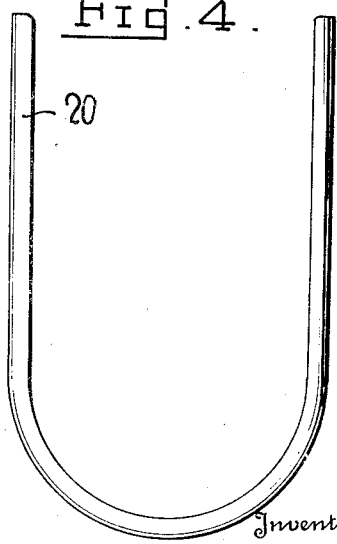
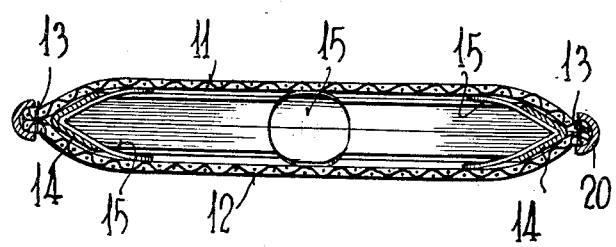
Inventor
Alfred F. Reilly,
By Carl Fruning
His Attorney Patented July 5, 1938

2,122,724

UNITED STATES PATENT OFFICE 2,122,724

SPECTACLE CASE

Alfred F. Reilly, North Attleboro, Mass., assignor to Evans Case Company, North Attleboro, Mass., a corporation of Massachusetts Application January 20, 1938, Serial No. 185,973

8 Claims. (Cl. 206—5)

The invention relates to a case for enclosing and protecting spectacles when they are not in use. The case may be carried in the pocket or in a bag or in any other desired place and is intended to afford more or less complete protection against dirt and injury to the spectacles. The case may consist of two sheets of soft flexible material which may be shaped to approximate the form of spectacles. They may be attached together by part or all of their edges, provision being made preferably at one end for an opening through which the spectacles may be inserted. It has been found in such devices that there is a tendency for the case to become malformed or misshapen and to unduly press upon the glasses and not properly protect them from outward pressure. In order to avoid this the present invention contemplates placing inside the body made of flexible sheets a stretching member which may be formed more or less the same general shape as the flexible members themselves. Such a body will be of strong material such as metal and preferably will be resilient and so constructed and arranged as to normally tend to expand the receptacle and to keep the covering material more or less taut. Such a device thus will tend to maintain the receptacle in its proper form or shape.

Inasmuch as most spectacles have between the lenses a nose piece which lies or projects substantially out of the planes of the lenses themselves there may be a tendency for the soft material to press against this nose piece and to allow outside pressure to deform or injure the nose piece. In order to insure protection to this portion of the glasses there may be associated with the stretching member separating or expanding members which may be properly placed to hold the flexible sides more or less permanently separate from each other in the neighborhood of the position in which the nose piece will lie when the spectacles are in the case. At the inner end of the receptacle there may be a tendency for the soft covering to press in upon the lens of the spectacles and not properly protect it. There may be provided a similar separating or expanding member at or near the inner end of the receptacle to hold the covering material away from the lens and relieve any strains put on the outside of the receptacle which might otherwise fall upon the lens to its detriment.

A suitable outer edge covering may be provided for the flexible members for their protection and to afford extra ornamentation to the structure.

In the accompanying drawing Figure 1 is a plan view of a spectacle case, the general position of the spectacles being indicated in dotted lines. Fig. 2 is a side view of a spectacle case. Fig. 3 is a plan view of the inner stretching member. Fig. 4 is a plan view of the exterior protecting member. Fig. 5 is a transverse vertical section on the line 5—5 of Fig. 1.

The spectacle case may be made of two sheets of flexible material marked respectively 11 and 12. The sheets as illustrated in Fig. 1 may be in general of oblong or oval shape. They may be placed face to face and attached together near their outer edges by sewing 13 or other suitable means. Such attachment preferably will not extend entirely around the periphery but may be omitted at one end leaving the end open. No specific material for the members 11 and 12 is essential to the present invention. They may be made of soft leather or fabric which in itself may be decorative or ornamented and when desired the members may be provided with a lining of any suitable material which may be soft and wear resisting so as to properly lie next to the spectacles.

A member 14 which may preferably be of channel metal, may be bent or otherwise formed to substantially the shape of the sewing 13 about the edges of the members 11 and 12. This member 14 may be of resilient or spring metal and may be initially formed so that there is a tendency for its upright legs to spread apart somewhat further than the width of the case. The member 14 when inserted into the receptacle formed by the members 11 and 12 will thus tend to lie against the inside of the edge of the receptacle and will tend to spread it apart and hold the flexible members 11 and 12 taut and smooth.

Rigid members 15 may be attached in any suitable way to the member 14 at proper positions. The members 15 preferably will consist of V shaped clips with their legs somewhat spread so that they support and hold separated the flexible members 11 and 12 while the members 11 and 12 are being stretched and held taut by the resilient member 14. As illustrated, two of the members 15 may be oppositely disposed at about the middle of the receptacle at or near the position in which the nose piece 16 of the glasses will lie when in the receptacle. One member 15 may be placed at or near the inner end of the receptacle so as to protect the inner lens 17 of the spectacles.

The open end of the spectacle case may be left open or may be held closed in any suitable way. In Fig. 1 a zipper or sliding closure mechanism 18 is illustrated. In Fig. 2 a simple snap button is illustrated.

The members 11 and 12 may be of fabric which may normally fray at the edges. In order to assist in preventing this fraying and in any event to cover, enclose and protect the edges of the flexible members 11 and 12 there may be provided a U shaped member 20 placed about and fastened or clamped to the outer edge of the members 11 and 12. The member 20 may be made of any suitable material. It may be of a precious or semi-precious metal or it may be enamelled, chased, embossed or otherwise suitably ornamented when desired.

Various changes in shape, materials, construction and other details may be made in other embodiments of the invention.

I claim as my invention:

1. A spectacle case comprising two formed sheets of flexible material fastened together about part of their edges and leaving a part unfastened for inserting spectacles, a resilient frame of substantially the same size and shape as the fastened edges and placed within the fastened sheets and biased to expand and hold taut the flexible material, spreading members on the resilient frame adapted to hold the sheets apart at predetermined locations to receive the nose pieces of the spectacles and at least one lens, means to hold closed the unfastened parts of the sheets, and an outer casing enclosing and concealing the fastened edges of the material.

2. A spectacle case comprising two formed sheets of flexible material fastened together about part of their edges, a resilient frame of substantially the same size and shape as the fastened edges and placed within the fastened sheets and biased to expand and hold taut the flexible material, wider spreading members on the resilient frame adapted to hold the sheets apart at predetermined locations to receive the nose pieces of the spectacles and at least one lens, and means to hold closed the unfastened parts of the sheets.

3. A spectacle case comprising two formed sheets of flexible material fastened together about part of their edges, a resilient frame of substantially the same size and shape as the fastened edges and placed within the fastened sheets and biased to expand and hold taut the flexible material, and wider spreading members on the resilient frame adapted to hold the sheets apart at predetermined locations to receive the nose pieces of the spectacles and at least one lens.

4. A spectacle case comprising two formed sheets of flexible material fastened together about part of their edges, a resilient frame of substantially the same size and shape as the fastened edges and placed within the fastened sheets and biased to expand and hold taut the flexible material, and wider spreading members on the resilient frame adapted to hold the sheets apart at predetermined locations.

5. A spectacle case comprising two formed sheets of flexible material fastened together about part of their edges, a resilient frame of substantially the same size and shape as the fastened edges and placed within the fastened sheets and biased to expand and hold taut the flexible material, and wider spreading members at predetermined points on the resilient frame.

6. A spectacle case comprising two formed sheets of flexible material fastened together about part of their edges, a resilient frame of narrow channel form of substantially the same size and shape as the fastened edges and placed within the fastened sheets and biased to expand and hold taut the flexible material, and angular spreading members wider than the frame at predetermined points on the frame.

7. A spectacle case comprising two formed sheets of flexible material fastened together about part of their edges, a narrow channel form of substantially the same size and shape as the fastened edges and placed within the fastened sheets and biased to expand and hold taut the flexible material, angular spreading members wider than the frame at predetermined points on the frame, and an outer casing enclosing and concealing the fastened edges of the material.

8. A spectacle case comprising two formed sheets of flexible material fastened together about part of their edges, a resilient frame of substantially the same size and shape as the fastened edges and placed within the fastened sheets and biased to expand and hold taut the flexible material, wider spreading members at predetermined points on the resilient frame, and an outer casing enclosing and concealing the fastened edges of the material.

ALFRED F. REILLY.